United States Patent
Aratani et al.

(10) Patent No.: US 10,787,720 B2
(45) Date of Patent: Sep. 29, 2020

(54) ELECTRIC RESISTANCE WELDED STEEL PIPE FOR HIGH-STRENGTH HOLLOW STABILIZER, AND METHOD FOR MANUFACTURING ELECTRIC RESISTANCE WELDED STEEL PIPE FOR HIGH-STRENGTH HOLLOW STABILIZER

(71) Applicant: JFE STEEL CORPORATION, Tokyo (JP)

(72) Inventors: Masatoshi Aratani, Tokyo (JP); Kenichi Iwazaki, Tokyo (JP); Shinsaku Kokubo, Tokyo (JP); Yuji Hashimoto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 275 days.

(21) Appl. No.: 15/763,859

(22) PCT Filed: Aug. 26, 2016

(86) PCT No.: PCT/JP2016/003880
§ 371 (c)(1),
(2) Date: Mar. 28, 2018

(87) PCT Pub. No.: WO2017/056384
PCT Pub. Date: Apr. 6, 2017

(65) Prior Publication Data
US 2018/0305780 A1    Oct. 25, 2018

(30) Foreign Application Priority Data
Sep. 29, 2015   (JP) .................... 2015-191003

(51) Int. Cl.
| | | |
|---|---|---|
| C22C 38/00 | (2006.01) | |
| C21D 8/10 | (2006.01) | |
| C22C 38/58 | (2006.01) | |
| C21D 9/08 | (2006.01) | |
| C22C 38/02 | (2006.01) | |
| C22C 38/04 | (2006.01) | |
| C22C 38/06 | (2006.01) | |
| C22C 38/20 | (2006.01) | |
| C22C 38/22 | (2006.01) | |
| C22C 38/24 | (2006.01) | |
| C22C 38/26 | (2006.01) | |
| C22C 38/28 | (2006.01) | |
| C22C 38/42 | (2006.01) | |
| C22C 38/50 | (2006.01) | |
| C22C 38/38 | (2006.01) | |
| C21D 9/50 | (2006.01) | |
| C22C 38/54 | (2006.01) | |
| B21C 37/08 | (2006.01) | |

(52) U.S. Cl.
CPC .............. *C21D 8/105* (2013.01); *C21D 8/10* (2013.01); *C21D 9/08* (2013.01); *C21D 9/085* (2013.01); *C21D 9/50* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/38* (2013.01); *C22C 38/42* (2013.01); *C22C 38/50* (2013.01); *C22C 38/54* (2013.01); *C22C 38/58* (2013.01); *B21C 37/08* (2013.01); *B60G 2206/427* (2013.01); *C21D 2211/001* (2013.01)

(58) Field of Classification Search
CPC ............ C21D 9/50; C22C 38/54; C22C 38/50
See application file for complete search history.

(56) References Cited

U.S. PATENT DOCUMENTS

| | | | | |
|---|---|---|---|---|
| 2013/0098899 A1* | 4/2013 | Kawabata | ............... | B21C 37/08 219/610 |
| 2015/0176101 A1* | 6/2015 | Ishitsuka | ................ | B21C 37/08 148/504 |
| 2015/0368768 A1* | 12/2015 | Aratani | ................ | C22C 38/005 420/83 |

FOREIGN PATENT DOCUMENTS

| | | |
|---|---|---|
| EP | 2857537 A1 | 4/2015 |
| JP | 2003-201543 A | 7/2003 |
| JP | 2005-076047 A | 3/2005 |
| JP | 2006-206999 A | 8/2006 |

(Continued)

OTHER PUBLICATIONS

Nov. 11, 2019 Office Action issued in Chinese Patent Application No. 201680056549.X.

(Continued)

*Primary Examiner* — Scott R Kastler
(74) *Attorney, Agent, or Firm* — Oliff PLC

(57) ABSTRACT

An electric resistance welded steel pipe manufactured by performing electric resistance welding on the steel pipe. The steel pipe having a chemical composition including by mass %, C: 0.20% to 0.40%, Si: 0.1% to 1.0%, Mn: 0.1% to 2.0%, Al: 0.01% to 0.10%, Cr: 0.01% to 0.5%, Ti: 0.01% to 0.05%, B: 0.0005% to 0.005%, Ca: 0.0001% to 0.0050%, N: 0.0050% or less, and Fe and inevitable impurities. Additionally, the steel pipe having a microstructure in which each of amounts of TiS particles, having a particle size of 10 μm or more, and MnS particles, having a particle size of 10 μm or more, are decreased to 0.1% or less in terms of cleanliness. The steel pipe having excellent fatigue resistance, exhibiting a high strength, and having an average grain size of prior austenite grains of 50 μm or less when subjected to cold forming followed by quenching and tempering treatments.

19 Claims, No Drawings

(56) References Cited

FOREIGN PATENT DOCUMENTS

| | | |
|---|---|---|
| JP | 2007-270349 A | 10/2007 |
| JP | 2008-208417 A | 9/2008 |
| JP | 2012-246550 A | 12/2012 |
| JP | 2013-147751 A | 8/2013 |
| WO | 2008/105216 A1 | 9/2008 |
| WO | 2009/093728 A1 | 7/2009 |
| WO | 2013/175821 A1 | 11/2013 |

OTHER PUBLICATIONS

Li Qingchun; "Theoretical Basis of Casting Formation;" Trial Textbook for Institution of Higher Education.; 1982 (4 pages).
Liu Ruitang; "Analysis and Examples of Mechanical Parts Failure;" Failures Caused by Material Factors; Chap. 6; 2015 (7 pages).
May 5, 2019 Office Action issued in Chinese Application No. 201680056549.X.
Jun. 5, 2019 Office Action issued in Korean Application No. 10-2018-7008314.
Feb. 12, 2019 Office Action issued in Candian Patent Application No. 2,991,104.
Jul. 12, 2018 Extended Search Report issued in European Patent Application No. 16850567.5.
Dec. 13, 2019 Office Action issued in Canadian Patent Application No. 2,991,104.
Oct. 25, 2016 Search Report issued in International Patent Application No. PCT/JP2016/003880.
Jul. 10, 2020 Office Action issued in Canadian Patent Application No. 2,991,104.

\* cited by examiner

ELECTRIC RESISTANCE WELDED STEEL PIPE FOR HIGH-STRENGTH HOLLOW STABILIZER, AND METHOD FOR MANUFACTURING ELECTRIC RESISTANCE WELDED STEEL PIPE FOR HIGH-STRENGTH HOLLOW STABILIZER

TECHNICAL FIELD

The present disclosure relates to an electric resistance welded steel pipe which can suitably be used for a stabilizer for an automobile and, in particular, relates to an increase in the corrosion fatigue resistance of an electric resistance welded steel pipe for a high-strength hollow stabilizer. In addition, the present disclosure relates to a method for manufacturing an electric resistance welded steel pipe for a high-strength hollow stabilizer, and to a high-strength hollow stabilizer and a method for manufacturing a high-strength hollow stabilizer.

BACKGROUND ART

Conventionally, almost every automobile is fitted with a stabilizer in order to decrease the degree of rolling of the automobile body at the time of cornering and in order to maintain driving stability at the time of high-speed driving. Nowadays, a hollow stabilizer composed of a steel pipe is generally used in order to reduce the weight of an automobile body. Such a hollow stabilizer is usually manufactured by using a seamless steel pipe or an electric resistance seam welded steel pipe (hereinafter, also referred to as "electric resistance welded steel pipe") as a material, by performing cold work on the material in order to achieve a desired shape, and by performing thermal refining such as quenching or quenching and tempering on the shaped material. In particular, an electric resistance welded steel pipe, which is comparatively inexpensive and excellent in terms of dimensional accuracy, is widely used as a material for a hollow stabilizer.

For example, Patent Literature 1 describes a method for manufacturing a hollow stabilizer having an excellent fatigue resistance. In the technique described in Patent Literature 1, a hollow stabilizer is manufactured by sequentially performing a forming process, in which a welded steel pipe having a chemical composition containing, by mass %, C: 0.2% to 0.38%, Si: 0.35% or less, Mn: 0.3% to 1.5%, Al: 0.1% or less, Ti: 0.005% to 0.1%, and B: 0.0005% to 0.005% is subjected to heating to a temperature of preferably 800° C. to 1000° C., subjected to diameter reduction rolling at a rolling temperature of 600° C. to 850° C. with an accumulated diameter reduction ratio of 40% or more, and further subjected to cold bending work in order to achieve the shape of a stabilizer, and a heat treatment process, in which a quenching treatment and a tempering treatment are performed. Patent Literature 1 states that, according to the technique described in Patent Literature 1, it is possible to increase fatigue resistance by using an inexpensive method.

In addition, Patent Literature 2 describes a steel pipe for a high-strength hollow stabilizer. The steel pipe described in Patent Literature 2 is an electric resistance welded steel pipe for a high-strength hollow stabilizer excellent in terms of strength-toughness balance after being subjected to a quenching treatment or a quenching and tempering treatment, the steel pipe having a chemical composition containing, by mass %, C: 0.20% to 0.38%, Si: 0.10% to 0.50%, Mn: 0.30% to 2.00%, Al: 0.01% to 0.10%, W: 0.01% to 1.50%, B: 0.0005% to 0.0050%, Ti: 0.001% to 0.04%, and N: 0.0010% to 0.0100%, in which the relationship N/14<Ti/47.9 is satisfied. Patent Literature 2 states that, according to the technique described in Patent Literature 2, it is easy to manufacture a hollow stabilizer having a high hardness of more than 400 HV and an excellent strength-toughness balance, which has not been conventionally obtained.

In addition, Patent Literature 3 describes a method for manufacturing an electric resistance seam welded steel pipe to be used after a heat treatment excellent in terms of flattening capability, the method including using steel having a chemical composition containing, by mass %, C: 0.15% to 0.40%, Si: 0.05% to 0.50%, Mn: 0.30% to 2.00%, Al: 0.01% to 0.10%, Ti: 0.001% to 0.04%, B: 0.0005% to 0.0050%, and N: 0.0010% to 0.0100%, in which Ti and N satisfy the relationship (N/14)<(Ti/47.9), as a material for a steel pipe, forming the material for a steel pipe into an open pipe having an approximately cylindrical shape, performing high-frequency resistance welding with the edges of the open pipe being allowed to butt against each other and with a heat input being controlled so that a bond width is 30 µm to 65 µm in order to obtain an electric resistance seam welded steel pipe, heating the electric resistance seam welded steel pipe to a temperature equal to or higher than the $Ac_3$ transformation temperature, and performing diameter reduction rolling with a rolling reduction ratio in terms of outer diameter equal to or more than (1-25/(bond width (µm) before diameter reduction rolling))×100(%) in order to reduce the bond width to 25 µm or less. Patent Literature 3 states that the electric resistance seam welded steel pipe manufactured by using the manufacturing method described in Patent Literature 3 can suitably be used for applications such as a hollow stabilizer, in which the steel pipe is subjected to a quenching treatment. Patent Literature 3 states that, since the decarburized layer width of the electric resistance weld zone of the electric resistance seam welded steel pipe described in Patent Literature 3 is small, it is possible to inhibit a decrease in the hardness of the quenched electric resistance weld zone even if a quenching treatment is performed by using a rapid short-time heating method, which results in a hollow stabilizer excellent in terms of durability being obtained.

In addition, Patent Literature 4 describes an electric resistance seam welded steel pipe to be used after a heat treatment excellent in terms of flattening capability, the steel pipe having a chemical composition containing, by mass %, C: 0.15% to 0.40%, Si: 0.05% to 0.50%, Mn: 0.30% to 2.00%, Al: 0.01% to 0.10%, Ti: 0.001% to 0.04%, B: 0.0005% to 0.0050%, and N: 0.0010% to 0.0100%, in which Ti and N satisfy the relationship (N/14)<(Ti/47.9), and an electric resistance weld zone has a bond width of 25 µm or less. Patent Literature 4 states that the electric resistance seam welded steel pipe described in Patent Literature 4 can suitably be used for applications such as a hollow stabilizer which is subjected to a quenching treatment. Patent Literature 4 states that, since the decarburized layer width of an electric resistance weld zone of the electric resistance seam welded steel pipe described in Patent Literature 4 is small, it is possible to inhibit a decrease in the hardness of the quenched electric resistance weld zone even if a quenching treatment is performed by using a rapid short-time heating method, which results in a hollow stabilizer excellent in terms of durability being obtained.

CITATION LIST

Patent Literature

PTL 1: Japanese Unexamined Patent Application Publication No. 2005-076047

PTL 2: Japanese Unexamined Patent Application Publication No. 2006-206999

PTL 3: Japanese Unexamined Patent Application Publication No. 2008-208417

PTL 4: Japanese Unexamined Patent Application Publication No. 2013-147751

SUMMARY

Technical Problem

As described above, according to the techniques described in Patent Literature 1 to Patent Literature 4, it is possible to achieve high strength (high hardness) and increase fatigue resistance which is required for the stabilizer of an automobile.

However, particularly for the purpose of road de-icing in winter in cold areas, a de-icing agent which contains a chloride such as NaCl or $CaCl_2$ is sprayed onto a road surface in order to prevent accidents such as a skidding accident. Therefore, water (such as snow or ice) containing chloride ions adheres to the lower part (suspension) of an automobile body, which results in a corrosive environment being provided. Therefore, nowadays, also the stabilizer of an automobile is required to have an excellent fatigue resistance in a corrosive environment, that is, corrosion fatigue resistance.

However, although it is possible to increase fatigue resistance in atmospheric air by using the techniques described in Patent Literature 1 to Patent Literature 4, there is no mention in Patent Literature 1 to Patent Literature 4 of fatigue resistance in a corrosive environment. There is a problem in that it is not possible to expect a marked increase in the corrosion fatigue resistance of an electric resistance welded steel pipe for a high-strength hollow stabilizer by using the techniques described in Patent Literature 1 to Patent Literature 4.

Therefore, an object of the present disclosure is, by solving the problems of the related art described above, to provide an electric resistance welded steel pipe for a high-strength hollow stabilizer excellent in terms of corrosion fatigue resistance and a method for manufacturing the electric resistance welded steel pipe for a high-strength hollow stabilizer, and a high-strength hollow stabilizer and a method for manufacturing the high-strength hollow stabilizer. Here, the term "high-strength" denotes to have the average hardness of 400 HV or more, or preferably 450 HV or more in terms of Vickers hardness in the wall thickness direction when subjected to cold forming followed by a quenching and tempering treatment. Here, in the case where the average hardness in the wall thickness direction is 550 HV or more, there is a significant decrease in toughness, and therefore the upper limit of the average hardness is set to be less than 550 HV.

In addition, the term "excellent in terms of corrosion fatigue resistance" here denotes a case where the number of cycles before cracking occurs is $5.0 \times 10^5$ or more when a fatigue test (reversed stress) is performed in a 5% NaCl aqueous solution with a load stress of ±400 MPa after being subjected to cold forming followed by a quenching and tempering treatment.

Solution to Problem

The present inventors, in order to achieve the object described above, conducted investigations regarding various factors having effects on the corrosion fatigue resistance of a high-strength hollow stabilizer.

As a result, it was found that corrosion fatigue causes the final fracture through stage (a) in which a corrosion pit is formed and grows, stage (b) in which the generation of a fatigue crack starts at the corrosion pit, and stage (c) in which the fatigue crack propagates. Then, in particular, the present inventors found that it is not possible to markedly increase the corrosion fatigue resistance of a high-strength hollow stabilizer until combining a method for inhibiting the progress of stage (a) and a method for inhibiting the progress of stage (c).

In addition, from the results of the additional investigations, the present inventors found that MnS particles having a particle size of 10 μm or more and TiS particles having a particle size of 10 μm or more have a large effect on the generation of a fatigue crack as a result of becoming the starting points at which corrosion pits are formed. Here, the term "particle size" denotes the largest diameter of each particle. In addition, the present inventors found that at is possible to inhibit the generation of a fatigue crack which starts at a corrosion pit by adding Ca and, optionally, REM in order to control the amounts of MnS particles having a particle size of 10 μm or more and TiS particles having a particle size of 10 μm or more, both of which become the starting points at which corrosion pits are formed, to be 0.1% or less in terms of cleanliness determined by using a point counting method in accordance with JIS G 0555.

Moreover, since hydrogen embrittlement has a large effect on "stage (c) in which the fatigue crack propagates" in a corrosion fatigue phenomenon in a corrosive environment, the present inventors thought that it is necessary to decrease the effect of hydrogen embrittlement as much as possible by decreasing the grain size of prior austenite grains. From the results of additional investigations conducted by the present inventors, it was found that the effect of hydrogen embrittlement on corrosion fatigue resistance is substantially eliminated in the case where the average grain size of prior austenite grains is controlled to be 50 μm or less by utilizing fine Ti carbides.

Moreover, the present inventors noticed that not only decreasing the grain size of crystal grains but also strengthening the grain boundaries of prior γ grains are important for increasing corrosion fatigue resistance by inhibiting the progress of "stage (c) in which the fatigue crack propagates" in a corrosion fatigue phenomenon. Thus, the present inventors conceived adding a small amount of B in order to strengthen the grain boundaries of prior γ grains. The inventors found that it is possible to inhibit P from being segregated at the grain boundaries of prior γ grains by adding a small amount of B and there is an increase in grain-boundary strength, which results in the propagation of a fatigue crack being inhibited.

The present disclosure has been completed on the basis of the findings described above and additional investigations. That is, exemplary disclosed embodiments are as follows.

(1) An electric resistance welded steel pipe for a high-strength hollow stabilizer, the steel pipe being an electric resistance welded steel pipe manufactured by performing hot diameter reduction rolling on an electric resistance welded steel pipe manufactured by performing an electric resistance welded pipe manufacturing process on a steel sheet, the steel pipe having: a chemical composition containing, by mass %, C: 0.20% to 0.40%, Si: 0.1% to 1.0%, Mn: 0.1% to 2.0%, P: 0.1% or less, S: 0.01% or less, Al: 0.01% to 0.10%, Cr: 0.01% to 0.5%, Ti: 0.01% to 0.05%, B: 0.0005% to 0.005%, Ca: 0.0001% to 0.0050%, N: 0.0050% or less, and the balance being Fe and inevitable impurities; and a microstructure in which each of the amounts of TiS particles having a particle size of 10 μm or more and MnS particles having a particle size of 10 μm or more is 0.1% or less (including 0%) in terms of cleanliness determined by a point counting method in accordance with JIS G 0555, the steel pipe being capable of having, when subjected to cold forming followed by a quenching and tempering treatment, a microstructure in which the average grain size of prior austenite grains is 50 μm or less and a hardness of 400 HV or more and less than 550 HV in terms of Vickers hardness.

(2) The electric resistance welded steel pipe for a high-strength hollow stabilizer according to item (1), in which the chemical composition further contains, by mass %, one or both selected from Cu: 1% or less, and Ni: 1% or less.

(3) The electric resistance welded steel pipe for a high-strength hollow stabilizer according to item (1) or (2), in which the chemical composition further contains, by mass %, one, two, or all selected from Nb: 0.05% or less, W: 0.05% or less, and V: 0.5% or less.

(4) The electric resistance welded steel pipe for a high-strength hollow stabilizer according to any one of items (1) to (3), in which the chemical composition further contains, by mass %, REM: 0.02% or less.

(5) A method for manufacturing an electric resistance welded steel pipe for a high-strength hollow stabilizer, the method including forming a steel sheet having a chemical composition containing, by mass %, C: 0.20% to 0.40%, Si: 0.1% to 1.0%, Mn: 0.1% to 2.0%, P: 0.1% or less, S: 0.01% or less, Al: 0.01% to 0.10%, Cr: 0.01% to 0.5%, Ti: 0.01% to 0.05%, B: 0.0005% to 0.005%, Ca: 0.0001% to 0.0050%, N: 0.0050% or less, and the balance being Fe and inevitable impurities into an open pipe having an approximately cylindrical shape by performing cold forming, performing electric resistance welding with the edges in the width direction of the open pipe to butt against each other and obtain an electric resistance welded steel pipe, heating the electric resistance welded steel pipe to a temperature of 850° C. to 1000° C., and performing hot diameter reduction rolling at a rolling temperature of 650° C. or higher with an accumulated diameter reduction ratio of 30% to 90%.

(6) The method for manufacturing an electric resistance welded steel pipe for a high-strength hollow stabilizer according to item (5), in which the chemical composition further contains, by mass %: one or both selected from Cu: 1% or less, and Ni: 1% or less; and/or one, two, or all selected from Nb: 0.05% or less, W: 0.05% or less, and V: 0.5% or less; and/or REM: 0.02% or less.

(7) A method for manufacturing a high-strength hollow stabilizer, the method including performing cold bending work followed by a quenching treatment or a quenching and tempering treatment on the electric resistance welded steel pipe for a high-strength hollow stabilizer according to any one of items (1) to (4).

(8) A high-strength hollow stabilizer having: a chemical composition containing, by mass %, C: 0.20% to 0.40%, Si: 0.1% to 1.0%, Mn: 0.1% to 2.0%, P: 0.1% or less, S: 0.01% or less, Al: 0.01% to 0.10%, Cr: 0.01% to 0.5%, Ti: 0.01% to 0.05%, B: 0.0005% to 0.005%, Ca: 0.0001% to 0.0050%, N: 0.0050% or less, and the balance being Fe and inevitable impurities; and a microstructure in which each of the amounts of TiS particles having a particle size of 10 μm or more and MnS particles having a particle size of 10 μm or more is 0.1% or less (including 0%) in terms of cleanliness determined by a point counting method in accordance with JIS G 0555 the hollow stabilizer having the average grain size of prior austenite grains of 50 μm or less and a hardness of 400 HV or more and less than 550 HV in terms of Vickers hardness.

Advantageous Effects

According to the present disclosure, it is possible to easily manufacture a high-strength hollow stabilizer having a hardness of 400 HV or more and excellent corrosion fatigue resistance, to provide a remarkable effect on the industry. The present disclosure also provides an effect of preventing decrease in corrosion fatigue resistance even if the strength is more increased and the hardness is further increased to the value of 450 HV or more, to contribute to further reduction in the wall thickness of a stabilizer.

DESCRIPTION OF EMBODIMENTS

The electric resistance welded steel pipe for a high-strength hollow stabilizer according to the present disclosure is an electric resistance welded steel pipe which is manufactured by performing an electric resistance welded pipe manufacturing process in which a steel sheet, preferably, a hot-rolled steel sheet, is formed into an open pipe having an approximately cylindrical shape by performing cold forming and is subjected to electric resistance welding with the edges in the width direction of the open pipe to butt against each other and obtain an electric resistance welded steel pipe as a material, by further reheating the electric resistance welded steel pipe as a material, and by performing hot diameter reduction rolling.

The electric resistance welded steel pipe for a high-strength hollow stabilizer according to the present disclosure has a chemical composition containing, by mass %, C: 0.20% to 0.40%, Si: 0.1% to 1.0%, Mn: 0.1% to 2.0%, P: 0.1% or less, S: 0.01% or less, Al: 0.01% to 0.10%, Cr: 0.01% to 0.5%, Ti: 0.01% to 0.05%, B: 0.0005% to 0.005%, Ca: 0.0001% to 0.0050%, N: 0.0050% or less, optional constituent chemical elements including one or both selected from Cu: 1% or less and Ni: 1% or less, and/or one, two, or all selected from Nb: 0.05% or less, W: 0.05% or less, and V: 0.5% or less, and/or REM: 0.02% or less, and the balance being Fe and inevitable impurities.

First, the reasons for the limitations on the chemical composition of the electric resistance welded steel pipe for a high-strength hollow stabilizer according to the present disclosure will be described. Hereinafter, "mass %" is simply referred to as "%", unless otherwise noted.

C: 0.20% to 0.40%

C is a chemical element which has a function of increasing the strength (hardness) of steel by promoting the formation of martensite through increasing hardenability and by forming a solid solution and which is thereby important for increasing the strength of a hollow stabilizer. In the present disclosure, it is necessary that the C content be 0.20% or more in order to achieve a hardness of 400 HV or more in terms of Vickers hardness after a quenching and tempering treatment. On the other hand, in the case where the C content is more than 0.40%, there is a decrease in toughness after a quenching treatment. Therefore, the C content is limited to be in the range of 0.20% to 0.40%. Here, it is preferable that the C content be 0.22% or more. It is preferable that the C content be 0.39% or less.

Si: 0.1% to 1.0%

Si functions as a deoxidizing agent and a solid solution-strengthening chemical element. It is necessary that the Si content be 0.1% or more in order to realize such effects. On the other hand, in the case where the Si content is more than 1.0%, there is a decrease in electric resistance welding capability. Therefore, the Si content is limited to be in the range of 0.1% to 1.0%. Here, it is preferable that the Si content be 0.1% or more. It is preferable that the Si content be 0.5% or less.

Mn: 0.1% to 2.0%

Mn is a chemical element which contributes to increasing the strength of steel by forming a solid solution and which increases the hardenability of steel, and it is necessary that the Mn content be 0.1% or more in order to achieve the desired high strength (high hardness) in the present disclosure. On the other hand, in the case where the Mn content is more than 2.0%, there is an increased risk of a decrease in toughness and hardening cracking. Therefore, the Mn content is limited to be in the range of 0.1% to 2.0%. Here, it is preferable that the Mn content be 0.5% or more. It is preferable that the Mn content be 1.8% or less.

P: 0.1% or Less

P is a chemical element which has a negative effect on weld cracking resistance and toughness by existing as an impurity and being segregated, for example, at grain boundaries. It is necessary that the P content be decreased to 0.1% or less in the case of steel for a hollow stabilizer. Here, it is preferable that the P content be 0.05% or less.

S: 0.01% or Less

S is a chemical element which decreases hot workability, toughness, and fatigue resistance as a result of existing in the form of sulfide-based inclusions in steel, and it is necessary that the S content be decreased to 0.01% or less in the case of steel for a hollow stabilizer. Here, it is preferable that the S content be 0.005% or less.

Al: 0.01% to 0.10%

Al functions as a deoxidizing agent and is effective, by combining with N, for achieving the enough amount of solid solute B which is effective for increasing hardenability. In addition, as a result of being precipitated in the form of AlN, Al has a function of preventing the austenite grains from coarsening when heating is performed for quenching. It is necessary that the Al content be 0.01% or more in order to realize such effects. On the other hand, in the case where the Al content is more than 0.10%, there may be a decrease in fatigue life due to an increase in the amount of oxide-based inclusions. Therefore, the Al content is limited to be in the range of 0.01% to 0.10%. Here, it is preferable that the Al content be 0.01% or more. It is preferable the Al content be 0.05% or less.

Cr: 0.01% to 0.5%

Cr is a chemical element which increases the hardenability of steel and which contributes to increasing corrosion resistance, and it is necessary that the Cr content be 0.01% or more in order to realize such effects. On the other hand, in the case where the Cr content is more than 0.5%, there is a decrease in electric resistance welding capability. Therefore, the Cr content is limited to be in the range of 0.01% to 0.5%. Here, it is preferable that the Cr content be 0.1% or more. It is preferable that the Cr content be 0.3% or less.

Ti: 0.01% to 0.05%

Ti is effective for achieving the enough amount of solid solute B which is effective for increasing hardenability, as a result of combining with N. In addition, as a result of being precipitated in the form of fine carbides, Ti contributes to increasing fatigue resistance (corrosion fatigue resistance) in a corrosive environment by contributing to refining of austenite grain size when a heat treatment such as quenching is performed. It is necessary that the Ti content be 0.01% or more in order to realize such effects. On the other hand, in the case where the Ti content is more than 0.05%, since a coarse titanium sulfide (TiS), which tends to become a starting point at which a corrosion pit is formed, tends to be formed, there is a decrease in corrosion resistance and corrosion fatigue resistance. Therefore, the Ti content is limited to be in the range of 0.01% to 0.05%. Here, it is preferable that the Ti content be 0.01% or more. It is preferable that the Ti content be 0.04% or less.

B: 0.0005% to 0.005%

B is a chemical element which is effective for increasing the hardenability of steel even when added in minute amounts. In addition, since B has a function of strengthening grain boundaries, B inhibits grain-boundary embrittlement due to the segregation of P. It is necessary that the B content be 0.0005% or more in order to realize such effects. On the other hand, in the case where the B content is more than 0.005%, since the effect becomes saturated, there is an economic disadvantage. Therefore, the B content is limited to be 0.0005% to 0.005%. Here, it is preferable that the B content be 0.001% or more. It is preferable that the B content be 0.003% or less.

Ca: 0.0001% to 0.0050%

Ca is a chemical element which has a function of controlling the shape of sulfide-based inclusions to be a fine approximately spherical shape. In the present disclosure, Ca is added in order to control each of the amounts of coarse TiS particles having a particle size of 10 µm or more and coarse MnS particles having a particle size of 10 µm or more, both of which become the starting points at which corrosion pits are formed, to be equal to or less than a specified amount (including 0). It is necessary that the Ca content be 0.0001% or more in order to realize such an effect. On the other hand, in the case where the Ca content is more than 0.0050%, since there is an excessive increase in the number of CaS-based large clusters, which become the starting points at which fatigue cracks are formed, there is a decrease in corrosion fatigue resistance. Therefore, the Ca content is limited to be in the range of 0.0001% to 0.0050%. Here, it is preferable that the Ca content be 0.001% or more. It is preferable that the Ca content be 0.003% or less.

N: 0.0050% or Less

N is inevitably contained as an impurity. As a result of combining with nitride-forming chemical elements in steel, N contributes to inhibiting coarsening of crystal grains and to increasing strength after tempering has been performed. However, in the case where the N content is more than 0.0050%, there is a decrease in the toughness of a welded zone. Therefore, the N content is limited to be 0.0050% or less. Here, it is preferable that the N content be 0.001% or less. It is preferable that the N content be 0.003% or less.

The chemical composition described above is the basic chemical composition, and, in the present disclosure, optional constituent chemical elements including one or both selected from Cu: 1% or less and Ni: 1% or less, and/or one, two, or all selected from Nb: 0.05% or less, W: 0.05% or less, and V: 0.5% or less, and/or REM: 0.02% or less may be further added.

One or Both Selected from Cu: 1% or Less and Ni: 1% or Less

Since Cu and Ni are both chemical elements which increase hardenability and corrosion resistance, Cu and Ni may be selectively added as needed. It is necessary that the Cu content be 0.05% or more or that the Ni content be 0.05% or more in order to realize such effects. On the other hand, since Cu and Ni are both expensive chemical elements, there is an increase in material costs in the case where the Cu content or the Ni content is more than 1%. Therefore, in the case where Cu or Ni is added, it preferable that the Cu content be limited to be 1% or less and that the Ni content be limited to be 1% or less. In addition, it is preferable that the Cu content be limited to be 0.05% or more and that the Ni content be 0.05% or more. Here, it is more preferable that the Cu content be 0.10% or more and that the Ni content, be 0.10% or more. It is more preferable that the Cu content be 0.50% or less and that the Ni content be 0.50%.

One, Two, or All Selected from Nb: 0.05% or Less, W: 0.05% or Less, and V: 0.5% or Less Since Nb, W, and V are all chemical elements which contribute to increasing strength (hardness) by forming fine carbides, one, two, or all of these chemical elements may be selectively added as needed. It is necessary that the Nb content be 0.001% or more, that the W content be 0.01% or more, or that the V content be 0.05% or more in order to realize such an effect. On the other hand, in the case where the Nb content is more than 0.05%, the W content is more than 0.05%, or the V content is more than 0.5%, since such an effect becomes saturated, it is not possible to expect an increase in effect corresponding to an increase in content, which results in an economic disadvantage. In addition, since there is a tendency for coarsening of carbides in such a case, there is a negative effect on toughness. Therefore, in the case where Nb, W, or V is added, it is preferable that the Nb content be limited to be 0.05% or less, that the W content be limited to be 0.05% or less, and that the V content be limited to be 0.5% or less. Here, it is more preferable that the Nb content be 0.001% or more, that the W content be 0.01% or more, and that the V content be 0.05% or more. It is more preferable that the Nb content be 0.03% or less, that the W content be 0.03% or less, and that the V content be 0.3% or less.

REM: 0.02% or Less

REM is, like Ca, a chemical element which has a function of controlling the shape of sulfide-based inclusions to be a fine approximately spherical shape and it is preferable that the REM content be 0.001% or more from the viewpoint of complementing the function of Ca in the present disclosure. On the other hand, in the case where the REM content is more than 0.02%, since there is an excessive increase in the number of inclusions, which become the starting points at which fatigue cracks are formed, there is a decrease in corrosion fatigue resistance. Therefore, in the case where REM is added, is preferable that the REM content be limited to be 0.02% or less. Here, it is more preferable that the REM content be 0.001% or more. It is more preferable that the REM content be 0.01% or less.

The remainder which is other than the constituent chemical elements described above is Fe and inevitable impurities.

Hereafter, the reasons for the limitations on the microstructure of the electric resistance welded steel pipe for a high-strength hollow stabilizer according to the present disclosure will be described.

The electric resistance welded steel pipe according to the present disclosure has a chemical composition described above and a microstructure in which each of the amounts of TiS particles having a particle size of 10 μm or more and MnS particles having a particle size of 10 μm or more is 0.1% or less (including 0%) in terms of cleanliness determined by a point counting method in accordance with JIS G 0555. TiS particles having a particle size of 10 μm or more and MnS particles having a particle size of 10 μm or more decrease corrosion resistance by becoming the starting points at which corrosion pits are formed. In addition, such particles decrease corrosion fatigue resistance by promoting the formation of fatigue cracks which start at the corrosion pits. Therefore, each of the amounts of TiS particles having a particle size of 10 μm or more and MnS particles having a particle size of 10 μm or more is controlled to be 0.1% or less (including 0%) in terms of cleanliness by adding Ca and, optionally, REM in appropriate amounts. In the case where the amount of TiS particles having a particle size of 10 μm or more or MnS particles having a particle size of 10 μm or more is more than 0.1% in terms of cleanliness, since those particles become the starting points at which corrosion pits are formed, there is a decrease in corrosion resistance and corrosion fatigue resistance. Therefore, the microstructure of the electric resistance welded steel pipe according to the present disclosure is limited to that controlled so that each of the amounts of TiS particles having a particle size of 10 μm or more and MnS particles having a particle size of 10 μm or more is 0.1% or less in terms of cleanliness. Here, the value of cleanliness is a value derived by a point counting method in accordance with JIS G 0555.

Hereafter, the preferable method for manufacturing the electric resistance welded steel pipe for a high-strength hollow stabilizer according to the present disclosure will be described.

The electric resistance welded steel pipe for a high-strength hollow stabilizer according to the present disclosure is an electric resistance welded steel pipe which is manufactured by using a steel sheet, preferably, a hot-rolled steel sheet, having the chemical composition described above as a material, by performing an electric resistance welded pipe manufacturing process in order to obtain an electric resistance welded steel pipe as a material, by further reheating the electric resistance welded steel pipe as a material, and by performing hot diameter reduction rolling.

It is not necessary to put any particular limitation on the electric resistance welded pipe manufacturing method. It is preferable that a steel sheet be formed into an open pipe having an approximately cylindrical shape by using a continuous cold forming method which utilizes plural rolls and subjected to electric resistance welding which utilizes, for example, high-frequency resistance welding or induction heating with the edges in the width direction of the open pipe to butt against each other by using squeeze rolls in order to obtain an electric resistance welded steel pipe having a specified size.

Subsequently, the obtained electric resistance welded steel pipe is further subjected to reheating and hot diameter reduction rolling in order to obtain an electric resistance welded steel pipe having a desired size. Here, it is preferable that the reheating temperature be 850° C. to 1000° C. In the case where the reheating temperature is lower than 850° C., there may be a case where it is not possible to achieve the desired toughness of a welded zone. On the other hand, in the case where the reheating temperature is higher than 1000° C., since significant surface decarburization occurs, there may be a decrease in surface quality. Therefore, it is preferable that the reheating temperature be in the range of 850° C. to 1000° C. Here, it is preferable that the rolling temperature of hot diameter reduction rolling be 650° C. or higher. In the case where the rolling temperature is lower than 650° C., since there is a decrease in workability, there may be a case where it is difficult to form to obtain a desired stabilizer shape. It is preferable that an accumulated diameter reduction ratio be 30% to 90%. In the case where the accumulated diameter reduction ratio is 30% to 90%, it is possible to form to obtain a desired stabilizer shape without a decrease in workability.

A high-strength hollow stabilizer is manufactured by using as a material an electric resistance welded steel pipe obtained through the use of the manufacturing method including diameter reduction rolling described above. The material is sequentially subjected to a forming process, a heat treatment process, and, optionally, a shot blasting treatment process, which is performed on the inner surface of the pipe, the outer surface of the pipe, or the inner and outer surface of the pipe, in order to obtain a high-strength hollow stabilizer.

In the forming process, the steel pipe is formed into a desired stabilizer shape. Examples of a forming method which may be used include any kind of commonly used method. It is preferable to use a cold bending work method from the viewpoint of inhibiting surface decarburization. Examples of a cold bending work method include a rotary draw-bending method and a press bending method.

The member (hollow stabilizer) which has been formed into a stabilizer shape is subsequently subjected to a heat treatment process. The heat treatment process includes a quenching treatment or a quenching and tempering treatment.

In the quenching treatment, it is preferable that the member be heated to a temperature equal to or higher than the $Ac_3$ transformation temperature, but more preferably 100° C. or lower, held at the temperature for a specified period of time, or more preferably one second or more, charged into a quenching tank, and rapidly cooled at a cooling rate of, for example, 10° C./s to 100° C./s. With this, it is possible to achieve a high strength and a high toughness. In the case where the heating temperature for quenching is higher than 1100° C., there is coarsening of austenite grains. Here, it is preferable that heating be performed by using an energization heating method from the viewpoints of inhibiting surface decarburization and of productivity. In addition, it is preferable that the coolant in the quenching tank be water, quenching oil, or a mixture of water and a polymer whose concentration is controlled.

After a quenching treatment has been performed, it is preferable that a tempering treatment be performed. In the tempering treatment, it is preferable that the tempering temperature be controlled in accordance with desired hardness. It is preferable that the tempering temperature be 200° C. to 450° C. By performing a tempering treatment, there is a significant increase in toughness.

Here, it is needless to say that it is preferable that a common shot blasting treatment be performed on the inner surface of the pipe, the outer surface of the pipe, or the inner and outer surface of the pipe after the heat treatment process has been performed in order to increase fatigue resistance.

The stabilizer obtained as described above has the chemical composition described above, a microstructure in which each of the amounts of TiS particles having a particle size of 10 μm or more and MnS particles having a particle size of 10 μm or more is 0.1% or less (including 0%) in terms of cleanliness determined by using a point counting method in accordance with JIS G 0555, the average grain size of prior austenite grains of 50 μm or less, and a hardness of 400 HV or more and less than 550 HV in terms of Vickers hardness.

EXAMPLES

Hot-rolled steel sheets (having a thickness of 4.5 mm) having the chemical compositions given in Table 1 were continuously formed into open pipes having an approximately cylindrical shape by using a cold forming method with plural rolls. Subsequently, electric resistance welding was performed by using a high-frequency electric resistance welding method with the edges in the circumferential direction of the open pipes to butt and press against each other to obtain electric resistance welded steel pipes (having an outer diameter of 89.1 mmφ and a wall thickness of 4.0 mm).

Furthermore, the obtained electric resistance welded steel pipes were reheated to the heating temperatures given in Table 2, subjected to a diameter reduction rolling process in which diameter reduction rolling was performed by using a stretch reducer with the diameter reduction ratios given in Table 2 to obtain electric resistance welded steel pipes having the size (an outer diameter of 25.4 mmφ and a wall thickness of 4.0 mm) given in Table 2, which were materials for hollow stabilizers.

By taking a test piece for microstructure observation (an observation surface of which is a cross section parallel to the pipe axis direction) from the electric resistance welded steel pipe, which was a material for a hollow stabilizer, and observing the test piece through the use of a scanning electron microscope (at a magnification of 500 to 2000 times), the kind, size, and number of existing inclusions (particles) were determined. The kind of the inclusion was identified by performing elemental constituent analysis through the use of an analyzing device (EDX-type analyzing device) fitted to the scanning electron microscope. In addition, the size of an inclusion particle was defined as the largest diameter of the inclusion particle in the cross section. Then, each of the numbers of TiS particles and MnS particles having a particle size of 10 μm or more was determined.

In addition, the electric resistance welded steel pipe, which was a material for a hollow stabilizer, was subjected to a quenching and tempering treatment under the conditions given in Table 2. Here, in the quenching treatment, the steel pipe was heated by using an energization heating method so that the outer surface temperature of the steel pipe was equal to the heating temperature given in Table 2 and then dipped in a water tank. After the quenching treatment had been performed, a tempering treatment was performed at the temperature given in Table 2 for 20 minutes. Here, since cold work has no effect on the average grain size of prior austenite grains or Vickers hardness, the quenching and tempering treatment was performed without performing cold work on the electric resistance welded steel pipe in the present EXAMPLE.

A test piece was taken from the electric resistance welded steel pipe which had been subjected to the quenching and tempering treatment and hardness was determined. The determination of hardness was performed on the cross section (C-cross section) at a right angle to the axis direction of the steel pipe at intervals of 0.1 mm in the wall thickness direction from the outer surface of the steel pipe to the inner surface of the steel pipe by using a Vickers hardness meter (with a load of 500 gf (4.9 N)).

In addition, by taking a test piece from the electric resistance welded steel pipe which had been subjected to the quenching and tempering treatment, by polishing a cross section at a right angle to the pipe axis direction, by etching the polished cross section with an etching solution (aqueous solution of picric acid) in order to expose the grain boundaries of prior austenite grains (prior γ grain boundaries), and by observing the etched cross section through the use of an optical microscope (at a magnification of 100 times), photographs were obtained in 10 or more of fields of view. Then, by performing image analysis on the obtained microstructure photographs, the grain size (average grain size) of prior austenite grains was calculated.

In addition, a sample having a specified length was taken from the electric resistance welded steel pipe, which was a material for a hollow stabilizer, and the sample was machined into a test piece for a corrosion fatigue test. Here, a parallel part having an outer diameter of 24.4 mmφ was formed in the central portion of the test piece. Subsequently, the obtained test piece was subjected to a quenching treatment by performing induction heating so that the surface temperature of the test piece was 950° C. and by spraying onto the test piece. After the quenching treatment had been performed, a tempering treatment was performed. The central parallel part of the test piece after the heat treatment was wrapped with absorbent cotton wet with a 5% NaCl aqueous solution in order to provide a wet environment, and a fatigue test was preformed. The number of cycles before cracking occurred was determined in order to evaluate corrosion fatigue resistance. Here, the test was performed under the conditions of a loading stress of ±400 MPa (reversed stress) and a loading frequency of 1 kHz.

The obtained results are given in Table 3.

TABLE 1

| Steel No. | Chemical Composition (mass %) | | | | | | | | | | | | | | Note |
|---|---|---|---|---|---|---|---|---|---|---|---|---|---|---|---|
| | C | Si | Mn | P | S | Al | Cr | Ti | B | Ca | N | Cu, Ni | Nb, W, V | REM | |
| A | 0.22 | 0.19 | 0.5 | 0.015 | 0.002 | 0.03 | 0.27 | 0.015 | 0.003 | 0.002 | 0.003 | — | — | — | Example |
| B | 0.22 | 0.19 | 0.5 | 0.015 | 0.002 | 0.03 | 0.27 | 0.015 | 0.003 | 0.002 | 0.003 | Cu: 0.2 | — | — | Example |
| C | 0.23 | 0.19 | 0.6 | 0.015 | 0.002 | 0.03 | 0.27 | 0.015 | 0.003 | 0.002 | 0.003 | Cu: 0.1, Ni: 0.2 | — | — | Example |
| D | 0.26 | 0.17 | 1.3 | 0.011 | 0.002 | 0.03 | 0.14 | 0.036 | 0.002 | 0002 | 0.003 | — | — | — | Example |
| E | 0.26 | 0.17 | 1.3 | 0.011 | 0.002 | 0.03 | 0.14 | 0.036 | 0.002 | 0.002 | 0.003 | Cu: 0.2 | — | — | Example |
| F | 0.26 | 0.17 | 1.2 | 0.011 | 0.002 | 0.03 | 0.14 | 0.036 | 0.002 | 0.002 | 0.003 | Cu: 0.1, Ni: 0.2 | — | — | Example |
| G | 0.26 | 0.17 | 1.2 | 0.011 | 0.002 | 0.03 | 0.14 | 0.036 | 0.002 | 0.002 | 0.003 | — | Nb: 0.01 | 0.002 | Example |
| H | 0.26 | 0.17 | 1.2 | 0.011 | 0.002 | 0.03 | 0.14 | 0.036 | 0.002 | 0.002 | 0.003 | — | W: 0.03, V: 0.1 | 0.002 | Example |
| I | 0.34 | 0.17 | 1.4 | 0.011 | 0.002 | 0.03 | 0.14 | 0.036 | 0.002 | 0.002 | 0.003 | — | — | — | Example |
| J | 0.34 | 0.17 | 1.4 | 0.011 | 0.002 | 0.03 | 0.14 | 0.036 | 0.002 | 0.002 | 0.003 | Cu: 0.2 | — | — | Example |
| K | 0.34 | 0.17 | 1.4 | 0.011 | 0.002 | 0.03 | 0.14 | 0.036 | 0.002 | 0.002 | 0.003 | Cu: 0.1, Ni: 0.2 | — | — | Example |
| L | 0.17 | 0.17 | 1.2 | 0.011 | 0.002 | 0.03 | 0.14 | 0.036 | 0.002 | 0.002 | 0.003 | Cu: 0.1, Ni: 0.2 | — | — | Comparative Example |
| M | 0.42 | 0.17 | 1.2 | 0.011 | 0.002 | 0.03 | 0.14 | 0.036 | 0.002 | 0.002 | 0.003 | Cu: 0.1, Ni: 0.2 | — | — | Comparative Example |
| N | 0.34 | 0.17 | 1.3 | 0.011 | 0.002 | 0.03 | 0.002 | 0.036 | 0.002 | 0.002 | 0.003 | Cu: 0.1, Ni: 0.2 | — | — | Comparative Example |
| O | 0.34 | 0.17 | 2.5 | 0.011 | 0.002 | 0.03 | 0.14 | 0.004 | 0.002 | 0.002 | 0.003 | Cu: 0.1, Ni: 0.2 | — | — | Comparative Example |
| P | 0.34 | 0.17 | 1.2 | 0.011 | 0.015 | 0.03 | 0.14 | 0.036 | 0.002 | 0.002 | 0.003 | Cu: 0.1, Ni: 0.2 | — | — | Comparative Example |
| Q | 0.34 | 0.17 | 1.2 | 0.011 | 0.002 | 0.03 | 0.14 | 0.036 | 0.002 | — | 0.003 | — | — | — | Comparative Example |

TABLE 2

| Material No. | Steel No. | Size of Electric Resistance Welded Steel Pipe Outer Diameter mmϕ × Wall Thickness mm | Diameter Reduction Rolling | | | Size after Diameter Reduction Rolling Outer Diameter mmϕ × Wall Thickness mm | Heat Treatment | | Note |
|---|---|---|---|---|---|---|---|---|---|
| | | | Heating Temperature (° C.) | Rolling Temperature (° C.) | Diameter Reduction Ratio (%) | | Quenching (° C.) | Tempering (° C.) | |
| 1 | A | 89.1ϕ × 4.5 | 980 | 800 | 71 | 25.4ϕ × 4.0 | 950 | 330 | Example |
| 2 | B | 89.1ϕ × 4.5 | 980 | 800 | 71 | 25.4ϕ × 4.0 | 950 | 300 | Example |
| 3 | C | 89.1ϕ × 4.5 | 980 | 800 | 71 | 25.4ϕ × 4.0 | 950 | 230 | Example |
| 4 | D | 89.1ϕ × 4.5 | 980 | 800 | 71 | 25.4ϕ × 4.0 | 950 | 330 | Example |
| 5 | E | 89.1ϕ × 4.5 | 980 | 800 | 71 | 25.4ϕ × 4.0 | 950 | 300 | Example |
| 6 | F | 89.1ϕ × 4.5 | 980 | 800 | 71 | 25.4ϕ × 4.0 | 950 | 240 | Example |
| 7 | G | 89.1ϕ × 4.5 | 980 | 800 | 71 | 25.4ϕ × 4.0 | 950 | 250 | Example |
| 8 | H | 89.1ϕ × 4.5 | 980 | 800 | 71 | 25.4ϕ × 4.0 | 950 | 250 | Example |
| 9 | I | 89.1ϕ × 4.5 | 980 | 800 | 71 | 25.4ϕ × 4.0 | 950 | 330 | Example |
| 10 | J | 89.1ϕ × 4.5 | 980 | 800 | 71 | 25.4ϕ × 4.0 | 950 | 280 | Example |
| 11 | K | 89.1ϕ × 4.5 | 980 | 800 | 71 | 25.4ϕ × 4.0 | 950 | 230 | Example |
| 12 | L | 89.1ϕ × 4.5 | 980 | 800 | 71 | 25.4ϕ × 4.0 | 950 | 300 | Comparative Example |
| 13 | M | 89.1ϕ × 4.5 | 980 | 800 | 71 | 25.4ϕ × 4.0 | 950 | 230 | Comparative Example |
| 14 | N | 89.1ϕ × 4.5 | 980 | 800 | 71 | 25.4ϕ × 4.0 | 950 | 280 | Comparative Example |
| 15 | O | 89.1ϕ × 4.5 | 980 | 800 | 71 | 25.4ϕ × 4.0 | 950 | 280 | Comparative Example |
| 16 | P | 89.1ϕ × 4.5 | 800 | 800 | 71 | 25.4ϕ × 4.0 | 950 | 280 | Comparative Example |
| 17 | F | 89.1ϕ × 4.5 | 800 | 800 | 71 | 25.4ϕ × 4.0 | 950 | 300 | Comparative Example |
| 18 | Q | 89.1ϕ × 4.5 | 980 | 800 | 71 | 25.4ϕ × 4.0 | 950 | 330 | Comparative Example |

TABLE 3

| Material No. | Steel No. | Microstructure Particles: Cleanliness (%) TiS | Microstructure Particles: Cleanliness (%) MnS | Hardness Average Hardness after Heat Treatment HV | Prior γ Grain Size (μm) | Fatigue Resistance Number of Cycles in Corrosion Environment | Note |
|---|---|---|---|---|---|---|---|
| 1 | A | 0.05 | 0.05 | 430 | 25 | 528510 | Example |
| 2 | B | 0.05 | 0.05 | 450 | 25 | 534510 | Example |
| 3 | C | 0.05 | 0.05 | 480 | 25 | 548510 | Example |
| 4 | D | 0.05 | 0.05 | 440 | 20 | 523610 | Example |
| 5 | E | 0.05 | 0.05 | 460 | 18 | 525810 | Example |
| 6 | F | 0.02 | 0.05 | 500 | 20 | 560260 | Example |
| 7 | G | 0.05 | 0.01 | 480 | 18 | 551250 | Example |
| 8 | H | 0.05 | 0.05 | 480 | 19 | 548560 | Example |
| 9 | I | 0.03 | 0.05 | 450 | 15 | 518520 | Example |
| 10 | J | 0.05 | 0.05 | 480 | 16 | 506850 | Example |
| 11 | K | 0.05 | 0.05 | 530 | 14 | 586520 | Example |
| 12 | L | 0.05 | 0.05 | _380_ | _55_ | 285630 | Comparative Example |
| 13 | M | 0.05 | 0.05 | _560_ | 25 | 278500 | Comparative Example |
| 14 | N | 0.05 | 0.05 | 480 | 25 | 275230 | Comparative Example |
| 15 | O | 0.05 | _0.3_ | 470 | _58_ | 255560 | Comparative Example |
| 16 | P | _0.20_ | _0.3_ | 480 | 25 | 287520 | Comparative Example |
| 17 | F | 0.02 | 0.05 | _390_ | 22 | 265360 | Comparative Example |
| 18 | Q | 0.15 | _0.20_ | 450 | 15 | 242250 | Comparative Example |

All the examples of the present disclosure had a hardness of 400 HV or more, that is, a high strength (a high hardness), after a quenching and tempering treatment was performed. Moreover, the examples were electric resistance welded steel pipes for a high-strength hollow stabilizer having excellent corrosion fatigue resistance represented by a number of cycles of $5.0 \times 10^5$ or more in a corrosive environment.

On the other hand, in the case of the comparative examples, which were out of the range according to the present disclosure, some had the hardness less than 400 HV after a quenching and tempering treatment had been performed, the desired high strength (high hardness) not being achieved, or there was a decrease in corrosion fatigue resistance in a corrosive environment.

The invention claimed is:

1. An electric resistance welded steel pipe for a high-strength hollow stabilizer, the steel pipe having a chemical composition comprising:
C: 0.20% to 0.40%, by mass %,
Si: 0.1% to 1.0%, by mass %,
Mn: 1.2% to 2.0%, by mass %,
P: 0.1% or less, by mass %,
S: 0.01% or less, by mass %,
Al: 0.01% to 0.10%, by mass %,
Cr: 0.01% to 0.5%, by mass %,
Ti: 0.01% to 0.05%, by mass %,
B: 0.0005% to 0.005%, by mass %,
Ca: 0.0001% to 0.0050%, by mass %,
N: 0.0050% or less, by mass %, and
Fe and inevitable impurities,
wherein:
the steel pipe has a microstructure in which each of amounts of TiS particles, having a particle size of 10 μm or more, and MnS particles, having a particle size of 10 μm or more, are 0.1% or less (including 0%) in terms of cleanliness determined by a point counting method in accordance with JIS G 0555, and the steel pipe, when subjected to cold forming followed by a quenching and tempering treatment, has a microstructure in which an average grain size of prior austenite grains is 50 μm or less and a hardness of 400 HV or more and less than 550 HV in terms of Vickers hardness.

2. The electric resistance welded steel pipe for a high-strength hollow stabilizer according to claim 1, wherein the chemical composition further comprises one or both selected from:
Cu: 1% or less, by mass %, and
Ni: 1% or less, by mass %.

3. The electric resistance welded steel pipe for a high-strength hollow stabilizer according to claim 1, wherein the chemical composition further comprises at least one selected from:
Nb: 0.05% or less, by mass %,
W: 0.05% or less, by mass %, and
V: 0.5% or less, by mass %.

4. The electric resistance welded steel pipe for a high-strength hollow stabilizer according to claim 1, wherein the chemical composition further comprises:
REM: 0.02% or less, by mass %.

5. A method for manufacturing an electric resistance welded steel pipe for a high-strength hollow stabilizer, the method comprising:
forming a steel sheet into an open pipe that has an approximately cylindrical shape by performing cold forming on the steel sheet, the steel sheet having a chemical composition comprising:
C: 0.20% to 0.40%, by mass %,
Si: 0.1% to 1.0%, by mass %,
Mn: 1.2% to 2.0%, by mass %,
P: 0.1% or less, by mass %,
S: 0.01% or less, by mass %,
Al: 0.01% to 0.10%, by mass %,
Cr: 0.01% to 0.5%, by mass %, Ti: 0.01% to 0.05%, by mass %,
B: 0.0005% to 0.005%, by mass %,
Ca: 0.0001% to 0.0050%, by mass %,
N: 0.0050% or less, by mass %, and
Fe and inevitable impurities,
performing electric resistance welding with edges of the open pipe in a width direction of the open pipe so that the edges abut against each other and in order to obtain an electric resistance welded steel pipe,
heating the electric resistance welded steel pipe to a temperature of 850° C. to 1000° C., and
performing hot diameter reduction rolling on the electric resistance welded steel pipe at a rolling temperature of 650° C. or higher with an accumulated diameter reduction ratio of 30% to 90%.

6. The method for manufacturing an electric resistance welded steel pipe for a high-strength hollow stabilizer according to claim 5, wherein the chemical composition further comprises:
one or both selected from:
Cu: 1% or less, by mass %, and
Ni: 1% or less, by mass %; and/or
at least one selected from:
Nb: 0.05% or less, by mass %,
W: 0.05% or less, by mass %, and
V: 0.5% or less; and/or
REM: 0.02% or less, by mass %.

7. A method for manufacturing a high-strength hollow stabilizer, the method comprising performing cold bending work followed by a quenching treatment or a quenching and tempering treatment on the electric resistance welded steel pipe for a high-strength hollow stabilizer according to claim 1.

8. A high-strength hollow stabilizer having a chemical composition comprising:
C: 0.20% to 0.40%, by mass %,
Si: 0.1% to 1.0%, by mass %,
Mn: 1.2% to 2.0%, by mass %,
P: 0.1% or less, by mass %,
S: 0.01% or less, by mass %,
Al: 0.01% to 0.10%, by mass %,
Cr: 0.01% to 0.5%, by mass %,
Ti: 0.01% to 0.05%, by mass %,
B: 0.0005% to 0.005%, by mass %,
Ca: 0.0001% to 0.0050%, by mass %,
N: 0.0050% or less, by mass %, and
Fe and inevitable impurities,
wherein:
the hollow stabilizer has a microstructure in which each of amounts of TiS particles, having a particle size of 10 μm or more, and MnS particles, having a particle size of 10 μm or more, are 0.1% or less (including 0%) in terms of cleanliness determined by a point counting method in accordance with JIS G 0555,
the hollow stabilizer having an average grain size of prior austenite grains of 50 μm or less, and
the hollow stabilizer having a hardness of 400 HV or more and less than 550 HV in terms of Vickers hardness.

9. The electric resistance welded steel pipe for a high-strength hollow stabilizer according to claim 2, wherein the chemical composition further comprises at least one selected from:
Nb: 0.05% or less, by mass %,
W: 0.05% or less, by mass %, and
V: 0.5% or less, by mass %.

10. The electric resistance welded steel pipe for a high-strength hollow stabilizer according to claim 2, wherein the chemical composition further comprises:
REM: 0.02% or less, by mass %.

11. The electric resistance welded steel pipe for a high-strength hollow stabilizer according to claim 3, wherein the chemical composition further comprises:
REM: 0.02% or less, by mass %.

12. The electric resistance welded steel pipe for a high-strength hollow stabilizer according to claim 9, wherein the chemical composition further comprises:
REM: 0.02% or less, by mass %.

13. A method for manufacturing a high-strength hollow stabilizer, the method comprising performing cold bending work followed by a quenching treatment or a quenching and tempering treatment on the electric resistance welded steel pipe for a high-strength hollow stabilizer according to claim 2.

14. A method for manufacturing a high-strength hollow stabilizer, the method comprising performing cold bending work followed by a quenching treatment or a quenching and tempering treatment on the electric resistance welded steel pipe for a high-strength hollow stabilizer according to claim 3.

15. A method for manufacturing a high-strength hollow stabilizer, the method comprising performing cold bending work followed by a quenching treatment or a quenching and tempering treatment on the electric resistance welded steel pipe for a high-strength hollow stabilizer according to claim 4.

16. A method for manufacturing a high-strength hollow stabilizer, the method comprising performing cold bending work followed by a quenching treatment or a quenching and tempering treatment on the electric resistance welded steel pipe for a high strength hollow stabilizer according to claim 9.

17. A method for manufacturing a high-strength hollow stabilizer, the method comprising performing cold bending work followed by a quenching treatment or a quenching and tempering treatment on the electric resistance welded steel pipe for a high strength hollow stabilizer according to claim 10.

18. A method for manufacturing a high-strength hollow stabilizer, the method comprising performing cold bending work followed by a quenching treatment or a quenching and tempering treatment on the electric resistance welded steel pipe for a high strength hollow stabilizer according to claim 11.

19. A method for manufacturing a high-strength hollow stabilizer, the method comprising performing cold bending work followed by a quenching treatment or a quenching and tempering treatment on the electric resistance welded steel pipe for a high strength hollow stabilizer according to claim 12.

* * * * *